(12) United States Patent
Mann et al.

(10) Patent No.: US 9,047,278 B1
(45) Date of Patent: Jun. 2, 2015

(54) IDENTIFYING AND RANKING ATTRIBUTES OF ENTITIES

(71) Applicant: Google Inc., Mountain View, CA (US)

(72) Inventors: Benjamin J. Mann, New York, NY (US); Randolph G. Brown, Palo Alto, CA (US); John R. Provine, Berkeley, CA (US); Vinicius J. Fortuna, New York, NY (US); Andrew W. Hogue, Ho-Ho-Kus, NJ (US)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 13/673,015

(22) Filed: Nov. 9, 2012

(51) Int. Cl.
*G06F 17/30* (2006.01)
*G06F 7/00* (2006.01)

(52) U.S. Cl.
CPC ...................................... *G06F 17/30* (2013.01)

(58) Field of Classification Search
CPC ........................................................ G06F 17/30
USPC ................................................. 707/769, 770
See application file for complete search history.

(56) References Cited

U.S. PATENT DOCUMENTS

| | | | |
|---|---|---|---|
| 7,536,382 B2 | 5/2009 | Zhou et al. | |
| 7,783,644 B1 | 8/2010 | Petrou et al. | |
| 7,818,315 B2 | 10/2010 | Cucerzan et al. | |
| 7,996,419 B2 | 8/2011 | Pfleger | |
| 8,117,208 B2 | 2/2012 | Chang et al. | |
| 8,214,363 B2 | 7/2012 | Chaudhary | |
| 8,352,460 B2 | 1/2013 | Allen et al. | |
| 8,402,031 B2 | 3/2013 | Govani et al. | |
| 8,452,795 B1 | 5/2013 | Finkelstein et al. | |
| 8,515,986 B2 | 8/2013 | Salvetti et al. | |
| 8,533,223 B2 | 9/2013 | Houghton | |
| 8,589,399 B1 | 11/2013 | Lee et al. | |
| 8,639,682 B2 | 1/2014 | Cumby et al. | |
| 8,661,026 B2 | 2/2014 | Bayliss | |
| 8,700,568 B2 | 4/2014 | Betz | |
| 2006/0206443 A1* | 9/2006 | Forman et al. .................. 706/20 |
| 2009/0234784 A1* | 9/2009 | Buriano et al. ................. 706/12 |
| 2010/0094854 A1 | 4/2010 | Rouhani-Kalleh | |
| 2010/0205198 A1* | 8/2010 | Mishne et al. ................ 707/759 |
| 2011/0022598 A1 | 1/2011 | Pennacchiotti et al. | |
| 2011/0231347 A1 | 9/2011 | Xu et al. | |
| 2012/0059838 A1 | 3/2012 | Berntson et al. | |
| 2012/0226681 A1 | 9/2012 | Paparizos et al. | |
| 2012/0265784 A1 | 10/2012 | Hsu et al. | |

(Continued)

FOREIGN PATENT DOCUMENTS

WO     2014/062192     4/2014

*Primary Examiner* — Apu Mofiz
*Assistant Examiner* — Farhad Agharahimi
(74) *Attorney, Agent, or Firm* — Fish & Richardson P.C.

(57) ABSTRACT

Methods, systems, and apparatus, including computer programs encoded on a computer storage medium, for query analysis. Queries are identified in query data, and an entity-descriptive portion and a suffix are determined in each query. Query counts are determined for a number of times that the respective queries occur in the query data. Based on the query counts, an entity-level count is estimated, which represents a number of query submissions that include the particular suffix and are considered to refer to a first entity. The entity is determined to be a particular type of entity. A type-level count is determined, which represents a number of query submissions that include the first suffix and are estimated to refer to entities of the particular type of entity. A score is assigned to the particular suffix based on the entity-level count and the type-level count.

27 Claims, 6 Drawing Sheets

(56) References Cited

U.S. PATENT DOCUMENTS

| | | | |
|---|---|---|---|
| 2013/0110830 A1* | 5/2013 | Vadlamani | 707/730 |
| 2013/0151538 A1 | 6/2013 | Dmitriev et al. | |
| 2013/0173639 A1 | 7/2013 | Chandra et al. | |
| 2013/0191329 A1 | 7/2013 | Dozier et al. | |
| 2013/0232129 A1 | 9/2013 | Cheng et al. | |
| 2013/0268517 A1 | 10/2013 | Madhavan et al. | |
| 2013/0332438 A1 | 12/2013 | Li et al. | |

* cited by examiner

| QUERY | COUNT |
|---|---|
| ... | ... |
| phoenix weather | 8642 |
| election statistics | 9134 |
| phoenix albums | 2467 |
| post office hours | 19865 |
| phoenix zip code | 12864 |
| san diego weather | 7564 |
| ... | ... |

200 — table; 201 — QUERY column; 202 — COUNT column

FIG. 2B

210 → phoenix weather
  212 — phoenix
  215 — weather

220 → hours for post office
  225 — hours
  222 — for post office

FIG. 2C

| QUERY | COUNT | PROBABILITY SCORES | | |
|---|---|---|---|---|
| | | BAND | CITY | BIRD |
| ... | ... | ... | ... | ... |
| phoenix | 13201 | 0.3 | 0.4 | 0.3 |
| phoenix lyrics | 1438 | 0.9 | 0.1 | -- |
| phoenix map | 7732 | 0.1 | 0.9 | -- |
| phoenix myth | 5734 | -- | 0.1 | 0.9 |
| phoenix weather | 8462 | 0.1 | 0.9 | -- |
| phoenix tour | 5432 | 0.3 | 0.7 | -- |
| phoenix record | 6223 | 0.7 | 0.3 | ... |
| ... | ... | ... | ... | ... |

258a: Count for Suffix "tour"
Phoenix (band) ID #10291
5432 × 0.3 = 1630

258b: Count for Suffix "tour"
Phoenix (city) ID #94159
5432 × 0.7 = 3802

IDENTIFYING AND RANKING ATTRIBUTES OF ENTITIES

BACKGROUND

The present specification relates to information retrieval.

Internet search engines aim to identify resources (e.g., web pages, images, text documents, multimedia content, etc.) that are relevant to a user's needs and to present information about the resources in a manner that is useful to the user. Users typically submit queries that indicate the information the users desire to retrieve. In response to the user-submitted queries, search engines then provide search results that identify resources or other information.

SUMMARY

Queries can be analyzed to determine the types of information that users of a search engine system are typically interested in obtaining. In many instances, the types of information a user is interested in for one entity (e.g., a subject or topic) is different from the type of information that a user is interested in obtaining for a different entity. By analyzing queries, the most frequently requested types of information for a particular entity can be identified. Then, when a user submits a query that refers to the particular entity, the most frequently requested information can be provided in response to the query. For example, a concise summary of the most commonly requested facts for the particular entity and other similar entities can be provided.

One innovative aspect of the subject matter described in this specification is embodied in methods that include the actions of: identifying queries in query data; determining, in each of the queries, (i) an entity-descriptive portion that refers to an entity and (ii) a suffix; determining a count of a number of times the one or more queries were submitted; estimating, based on the count, an entity-level count of query submissions that include the particular suffix and are considered to refer to a first entity; determining that the entity is a particular type of entity; determining a type-level count of the query submissions that include the first suffix and are estimated to refer to entities of the particular type of entity; and assigning a score to the particular suffix based on the entity-level count and the type-level count.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, obtaining scores for one or more other suffixes that occur in query submissions estimated to refer to an entity of the particular entity type; and ranking the particular suffix and the other suffixes based on their respective scores. Selecting suffixes in a highest-ranking portion of the ranked suffixes; mapping each of the selected suffixes to a factual attribute of the first entity; and designating the factual attributes as frequently requested facts about the first entity. Receiving a query submission; determining that a likelihood that the query submission refers to the first entity satisfies a threshold; in response to determining that the likelihood that the query submission refers to the first entity satisfies a threshold: accessing data identifying the factual attributes designated as frequently requested facts about the first entity, and providing information about the first entity for each of the factual attributes in response to receiving the query submission. Providing information about the first entity for each of the factual attributes includes providing a search results page that presents the information about the first entity for each of the factual attributes with search results responsive to the query submission. Based on the score assigned to the particular suffix, selecting an attribute corresponding to the particular suffix as an attribute for the first entity. Receiving a query submission that refers to the first entity, and in response to receiving the query submission that refers to the first entity, providing data that identifies the attribute and a value of the attribute for the first entity. Selecting a highest-ranking portion of the ranked suffixes; determining that one or more of the highest-ranking suffixes are each associated with an objective fact; in response to determining that one or more of the selected suffixes are each associated with an objective fact: mapping each of the one or more of the selected suffixes to a factual attribute, and designating the factual attributes as frequently requested attributes for the first entity.

These and other embodiments may each optionally include one or more of the following features. For instance, determining that one or more of the selected suffixes are each associated with an objective fact includes obtaining input from one or more human raters indicating whether the one or more human raters consider the selected suffixes to be associated with objective facts. Obtaining input from the one or more human raters indicating whether the human raters consider the selected suffixes to be associated with objective facts includes: sending, to each of multiple human raters, a list of suffixes occurring in query submissions that reference a particular entity of the particular type of entity, and receiving, from each of the multiple human raters, input whether the human rater considers each of the suffixes to be associated with an objective fact for the particular entity. Estimating the entity-level count includes: obtaining a probability score that indicates a probability that the query refers to the first entity, and adjusting the query count based on the probability score to determine the entity-level count. Estimating the entity-level count includes distributing the query count among multiple different entities based on the scores by assigning, to each of the multiple different entities, a partial query count that represents an estimate of a number of occurrences of the query string that refer to the entity.

Advantageous implementations can include one or more of the following features. Query data can be used to identify information that is commonly requested by users of a search engine system. Information about a particular entity can be combined with information about other entities of the same type. Input from human raters can be used to identify which query components represent requests for factual information. Information can be designated as commonly requested information for a particular entity. In response to a query that refers to the particular entity, the designated information designated as commonly requested can be provided, even if the query does not specifically request that information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
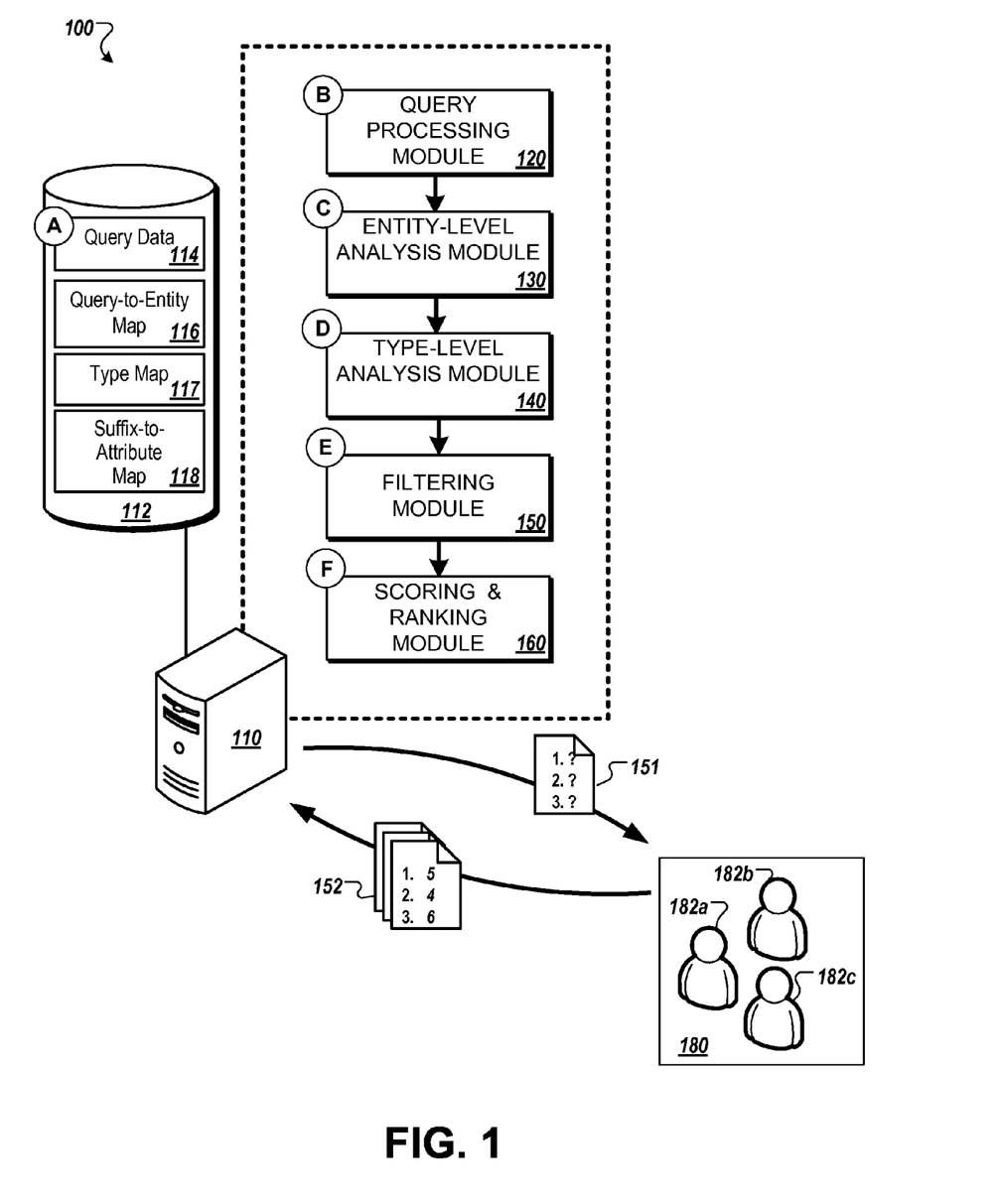
FIG. 1 is a diagram that illustrates an example of a system for query analysis.

FIG. 1 is a diagram that illustrates an example of a system 100 for query analysis. The system 100 includes a computing system 110 that communicates with one or more data storage devices 112. The computing system 110 includes a query processing module 120, an entity-level analysis module 130, a type-level analysis module 140, a filtering module 150, and a scoring and ranking module 160. The computing system 100 also communicates with a panel 180 of human raters 182*a*-182*c* that provide input used in the query analysis. The diagram shows stages (A) to (F), which illustrate a flow of data, and which may occur in the sequence illustrated or in a different sequence.

FIGS. 2A-2E are diagrams illustrating examples of data used in query analysis. The system 100 is described below using examples shown in FIGS. 2A-2E.

In general, query analysis can be used to identify the types of information that search engine users request most frequently about various subjects. Typically, the most frequently requested information is also most likely to be of interest to search engine users in general. After frequently requested information about a subject has been identified, that information can be provided to search engine users to enhance the search experience.

In many instances, the type of information a search engine user is interested in depends on the subject of the query. Different types of information are often desired about different subjects. For example, the set of facts that users want to know about a car (e.g., gas mileage, engine size, and top speed) may be different than the set of facts that the users want to know about a building (e.g., size, height, and location). As another example, the information that users want to know about musicians may be different from the information users want to know about politicians.

Potential subjects of a query are referred to as entities. For example, an entity can be a person, place, thing, or idea. For each entity, there are various types of information, or attributes of the entity, that could be of interest to a search engine user. Examples of attributes for a person include the person's height, weight, age, hometown, employer, educational history, and so on. Examples of attributes for a building include its size, height, location, architectural style, date of construction, and so on.

As described further below, certain portions of queries identify an entity or subject of the query, and other portions identify attributes of interest to the user. An entity-descriptive portion refers to an entity, and a suffix refers to an attribute of interest. For example, in the query "new york weather," the portion "new york" is an entity-descriptive portion that refers to New York City as the subject of the query. The portion "weather" is a suffix that identifies an attribute, weather information, desired about New York City.

The computing system 110 can analyze queries to determine which suffixes (e.g., phrases or terms in queries) are used most frequently with particular entities. The computing system 110 can also determine which suffixes are used with entities of the same category or entity type. Information about the use of suffixes for individual entities and for groups of multiple entities can be combined to determine what information search engine users will find useful.

In some implementations, the computing system 110 identifies queries in query data and identifies, in each of the queries, (i) an entity-descriptive portion that refers to an entity and (ii) a suffix. The computing system 110 determines a query count of a number of times the respective queries were submitted. Based on the query counts, the computing system 110 estimates an entity-level count of query submissions that include the particular suffix and are considered to refer to a first entity. The computing system 110 determines that the entity is a particular type of entity, and determines a type-level count of the query submissions that include the first suffix and are estimated to refer to entities of the particular type of entity. The computing system 110 assigns a score to the particular suffix based on the entity-level count and the type-level count.

Referring to FIG. 1, in stage (A), the query processing module 120 accesses query data 114. For example, the query data 114 may include one or more query logs, or portions of query logs. The query data 114 may include raw data about queries and/or processed data, such as data that has been normalized or standardized. The query data 114 include data about queries that have been submitted by users to one or more search engine systems. For example, the query data 114 can indicate query strings or query terms submitted to one or more search engines as search requests. The query data 114 can be stored in any appropriate data storage format, for example, one or more of a database, an index, a table, a file, or another data structure. In some implementations, the query data 114 include data about queries submitted by multiple different users. In some implementations, the query data 114 include data that describe queries submitted over a particular period of time, for example, queries submitted during a period of 2 weeks, a month, 3 months, or a year.

In stage (B), the query processing module 120 performs initial analysis of the data in the query data 114. In some implementations, the query processing module 120 determines the frequency with which the various queries described by the query data 114 were submitted as search requests. The query processing module 120 determines query counts that indicate the number of times each query was submitted. For example, for each unique query string, the query processing module 120 determines a number of instances of the query string in the query data 114.

Figure 2A:
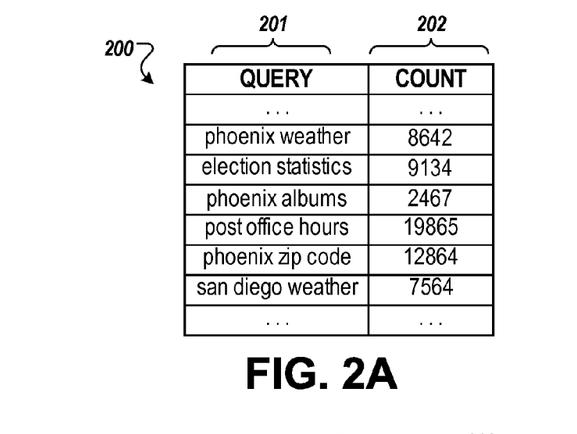
FIGS. 2A-2F are diagrams illustrating examples of data used in query analysis.

In the illustrated example, FIG. 2A shows a table 200 that includes query counts 202 for queries 201 identified in the query data 114. As shown in the table 200, the query processing module 120 has determined that the query "phoenix weather" was submitted 8642 times (e.g., in 8462 different search requests or query submissions), the query "election statistics" was submitted 9134 times, and so on. In some implementations, the query data 114 is normalized prior to analysis. For example, the queries "Phoenix weather," "phoenix weather," and "pheonix weather" can each be normalized so that they are counted as the same query.

Referring again to FIG. 1, the query processing module 120 also divides the queries 201 in the query data 114 into different query components. From each query, the query processing module 120 attempts to extract at least two query components, such as an entity-descriptive portion and a suffix.

The entity-descriptive portion includes information that refers to or otherwise identifies a particular entity. In some instances, an entity-descriptive portion may include a name or a description of a particular entity. For example, a business could be referred to by its name, or by a product, slogan, or other information associated with the business. As another example, an entity that is a person, the entity-descriptive portion may be a name, nickname, title, position held, or other information associated with the person. As another example, for an entity that is a building, the entity-descriptive portion may include a building name, a street address, a distinguishing feature, or other information. As described further below, the entity-descriptive portion may uniquely identify a single entity, or may potentially refer to any of multiple entities.

The suffix is a portion of a query that represents a type of information requested about the entity referred to in the entity-descriptive portion. As an example, for the query "empire state building height," the entity-descriptive portion may be "empire state building" and the suffix may be "height." In this example, the suffix "height" represents a request for information about the height of the referenced entity.

In some implementations, the suffix and the entity-descriptive portion are distinct and separate, so that the suffix does not include any of the entity-descriptive portion, and the entity-descriptive portion does not include any of the suffix. The suffix may occur after the entity-descriptive portion, or may occur before the entity-descriptive portion. An entity-descriptive portion and a suffix may include a contiguous portion of a query and/or may include multiple non-adjacent portions of the query.

To separate a query into an entity-descriptive portion and a suffix, the query processing module 120 obtains data from a query-to-entity map 116. The query-to-entity map 116 includes data that identifies one or more entities that are associated with various queries. The query-to-entity map 116 can be implemented so that variations of certain words or phrases are considered to refer to the same entity. For example, the query-to-entity map 116 may normalize the queries "Phoenix," "phoenix," or "pheonix" and indicate each of these queries refers to the same entity.

The query processing module 120 provides a query to the query-to-entity map, and the query-to-entity map 116 returns data identifying the entity-descriptive portion of the query. The query processing module 120 extracts the suffix from the remainder of the query. In some implementations, the suffix is the entire query excluding the entity-descriptive portion. In some implementations, the suffix is a noun or noun phrase that occurs in the query outside the entity-descriptive portion. The suffix may occur before or after the entity-descriptive portion in the query.

Figure 2B:
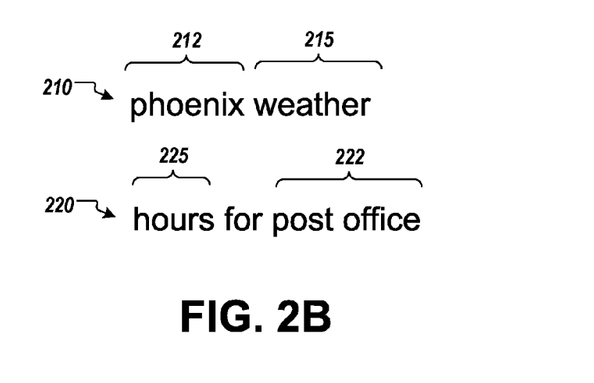

FIG. 2B illustrates examples of queries 210, 220 processed by the query processing module 120. For example, the query processing module 120 submits the query 210 "phoenix weather" to the query-to-entity map 116 and receives data indicating that "phoenix" is an entity-descriptive portion 212. The query processing module selects the remainder of the query 210, "weather," as a suffix 215 for the query 210.

As another example, for the query 220 "hours for post office," the query processing module 120 receives data from the query-to-entity map 116 indicating that "post office" is an entity descriptive portion 222. From the remainder of the query 220, the query processing module 120 extracts "hours" as the suffix.

Referring again to FIG. 1, in stage (C), the entity-level analysis module 130 generates data about the frequency that different suffixes occur with references to specific entities. For example, the entity-level analysis module 130 estimates a count of query submissions that refer to a particular entity and include a particular suffix. For a given entity, the suffixes that occur most frequently in queries referring to an entity can indicate the types of information that search engine users are most likely to be interested in when searching about the entity.

The entity-level analysis module 130 uses the query-to-entity map 116 to identify entities corresponding to the entity-descriptive portions of the queries 201. For example, entity-level analysis module 130 provides a query to the query-to-entity map 116. The query-to-entity map 116 returns identifiers for one or more entities to which the query may refer. The query-to-entity map 116 also provides, for each entity identified, a probability score indicating a probability that the query refers to that entity. The entity-level analysis module 130 then distributes the query count for the query among the identified entities, based on the probability scores.

Figure 2C:
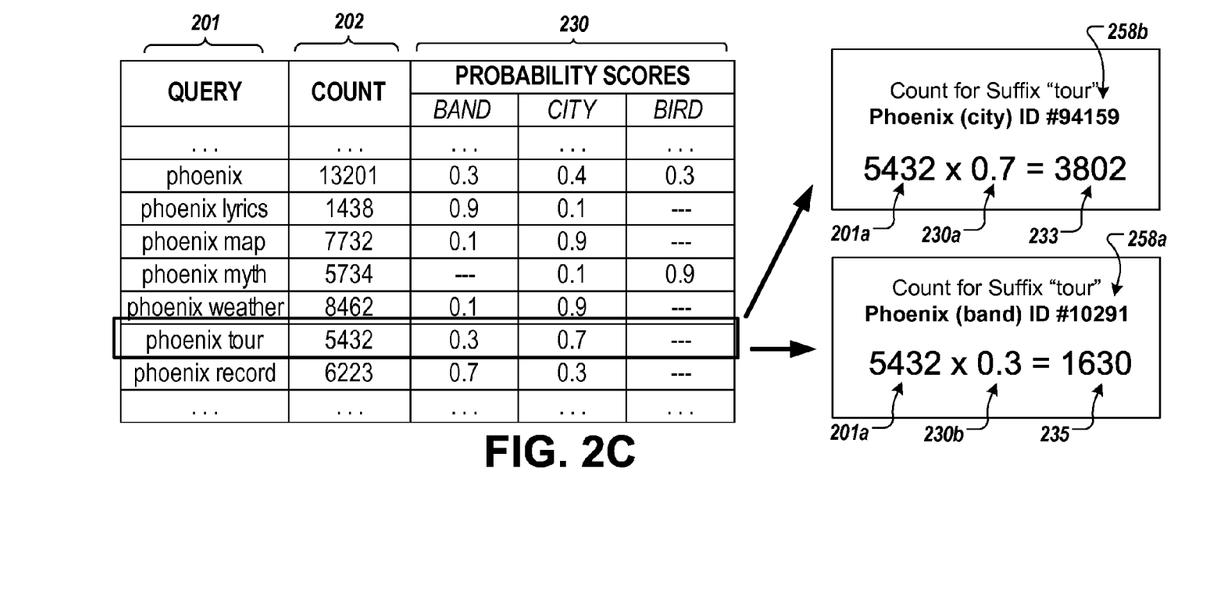

As an example, FIG. 2C illustrates various queries 201 and scores returned by the query-to entity map 116 for those queries. Each of the queries 201 shown includes the term "phoenix." However, the query term "phoenix" may refer to any of several different entities, such as a city in Arizona, a musical group of the same name, or a mythical bird. The query-to entity map 116 provides probability scores 230 that indicate a probabilities that an instances of the queries 201 refer to the different entities. In the illustrated example, for the query "phoenix," the probability scores 230 indicate that there is a 30% likelihood that the query "phoenix" refers to the band, a 40% likelihood that the query refers to the city, and a 30% likelihood that the query refers to the mythical bird.

Because the entity-level analysis module 130 provides entire queries to the query-to-entity map 116, the query-to-entity map 116 can use the entire query to determine which entities are likely referred to by the entity-descriptive portion. Rather than assigning probabilities based on the entity-descriptive portion alone, the query-to-entity map 116 can provide probabilities using Bayesian updating, with additive smoothing, using the entire query. As an example, while the term "phoenix" alone may be ambiguous, a suffix occurring with the term may clarify the likely meaning. In the illustrated example, the probability scores 230 indicate that the query "phoenix lyrics" most likely refers to the band, while for the query "phoenix map" most likely refers to the city.

Using the probability scores 230, the entity-level analysis module distributes the query counts 202 among multiple entities based on the probability scores 230. When a query potentially refers to multiple entities, a portion of the query count is attributed to each of the entities. In the illustrated example, the probability scores 230 are scaling factors that are multiplied with the query counts 202. The product of a query count and a probability score is a portion of the query count to attribute to a particular entity, representing an estimate of the number of times users intended to refer to the particular entity when submitting the query.

In the illustrated example, a query count 201a indicates that the query "phoenix tour" was submitted 5432 times. The query may refer to a tour of the city of Phoenix or to performances of the band Phoenix. A probability score 230a indicates that there is a 70% likelihood that the query refers to the city of Phoenix, and a probability score 230b indicates that there is a 30% likelihood that the query refers to the band Phoenix. The entity-level analysis module 130 multiplies the query count 201a with the probability score 230a for the city of Phoenix, producing an entity-level suffix count 233. The entity-level suffix count 233 approximates the number of times that users submitted the query "phoenix tour" intending to refer to the city of Phoenix. Thus the entity-level suffix count 233 is an estimate of the number of times that the suffix "tour" was used with a reference to the city of Phoenix. In a similar manner, the entity-level analysis module 130 multiplies the query count 201b with the probability score 230b for the band Phoenix, producing an entity-level suffix count 235 as an estimate of the number of times that the suffix "tour" was used with reference to the band Phoenix.

Figure 2D:
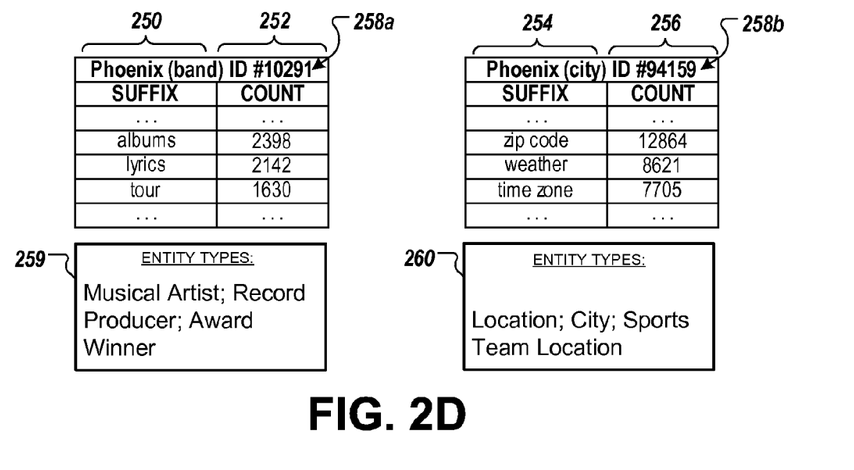

The entity-level analysis module 130 outputs data identifying suffixes and corresponding entity-level suffix counts for each of the entities referred to by the queries 201. As illustrated in FIG. 2D, the entity-level analysis module 130 outputs data indicating that suffixes 250 used with reference to the band Phoenix include "albums," "lyrics," and "tour." The entity-level analysis module 130 also outputs data indicating the entity-level suffix counts 252 for each of the suffixes 250. Suffixes 254 used with reference to the city of Phoenix are also shown with corresponding entity-level suffix counts 256.

In some implementations, the entity-level analysis module 130 combines query counts for different queries when determining an entity-level suffix count. For example, suffix counts for queries having different entity-descriptive portions can be combined when the queries include the same suffix and refer to the same entity. For example, for the band Phoenix, the entity-level suffix count for the suffix "albums" can include query counts for the query "phoenix albums," "phoenix band albums," and other queries that include the suffix "albums" but refer to the band Phoenix with different words.

In some implementations, each entity has a unique identifier in the query-to-entity map 116. The unique entity identifier distinguishes each entity from all other entities. The entity identifier may be a numerical value, a string, or another type of value. By referring to entities using unique entity identifiers, the query-to-entity map 116 and the computing system 110 can avoid ambiguity when entities have similar or identical names. In addition, because the entity identifier can be independent of the common or natural language name of an entity, the entity identifier for an entity can remain consistent when an entity's name changes.

In the illustrated example, a unique entity identifier 258*a*, 258*b* is assigned to each entity. In response to receiving a query from the computing system 110, the query-to-entity map 116 provides entity identifiers 258*a*, 258*b* to indicate which entities the query likely refers to. While the query-to-entity map 116 may store the word "phoenix" as a name or part of a name for both the band Phoenix and the city of Phoenix, the query-to-entity map 116 provides entity identifiers 258*a*, 258*b* to eliminate ambiguity as to which entities are referenced. In a similar manner, during the processing described herein, the computing system 110 may associate counts and other data about entities with the entity identifiers 258*a*, 258*b* rather than merely text of an entity name.

In some implementations, the entity-level analysis module 130 combines suffix counts for different suffixes into a single entity-level suffix count. For example, the computing system 110 determines that two or more suffixes refer to substantially the same type of information, and can combine the suffix counts for the two or more suffixes into a single suffix count for a representative suffix. As an example, a combined suffix count can be determined for variations of a term or phrase. The suffix count for a singular term (e.g., "album") can be combined with a suffix count for the plural (e.g., "albums"). In a similar manner, suffix counts for suffixes that are misspellings can be combined with suffix counts for the correct spellings. As another example, suffixes that represent a request for substantially the same information can be combined into a single suffix count. As an example, the suffix counts for suffixes "image," "picture," "photo," and "photograph" may be combined into a single representative suffix, such as "photo."

Referring again to FIG. 1, in stage (D), the type-level analysis module 140 generates type-level suffix counts by combining the entity-level suffix counts for entities of the same type. Each entity can be assigned one or more entity types. An entity type can be a category, class, or other grouping of entities. Each entity type can refer to a set of entities determined to have one or more characteristics in common. Some examples of entity types include musical artists, politicians, locations, and vehicles. In some implementations, each entity is assigned at least one entity type.

The type-level analysis module 140 identifies types associated with each of the entities identified in output from the entity-level analysis module 140. In some implementations, the one or more data storage devices 112 store a type map 117 that identifies entity types associated with each of the entity identifiers 258*a*, 258*b*. The type-level analysis module 140 can use the entity identifiers 258*a*, 258*b* to look up entity types associated with the entities. For example, as shown in FIG. 2D, the type-level analysis module 140 determines that the band Phoenix is assigned the entity types 259 (e.g., "musical artist," "record producer," and "award winner"). The city of Phoenix is assigned the entity types 260 ("location," "city," and "sports team location").

Using the output of the entity-level analysis module 130, the type-level analysis module 140 aggregates entity-level suffix counts for entities of the same type. The aggregated counts are referred to as type-level suffix counts. A type-level suffix count indicates a number of times users are estimated to have used a particular suffix in a query while referring to an entity of that entity type.

Figure 2E:
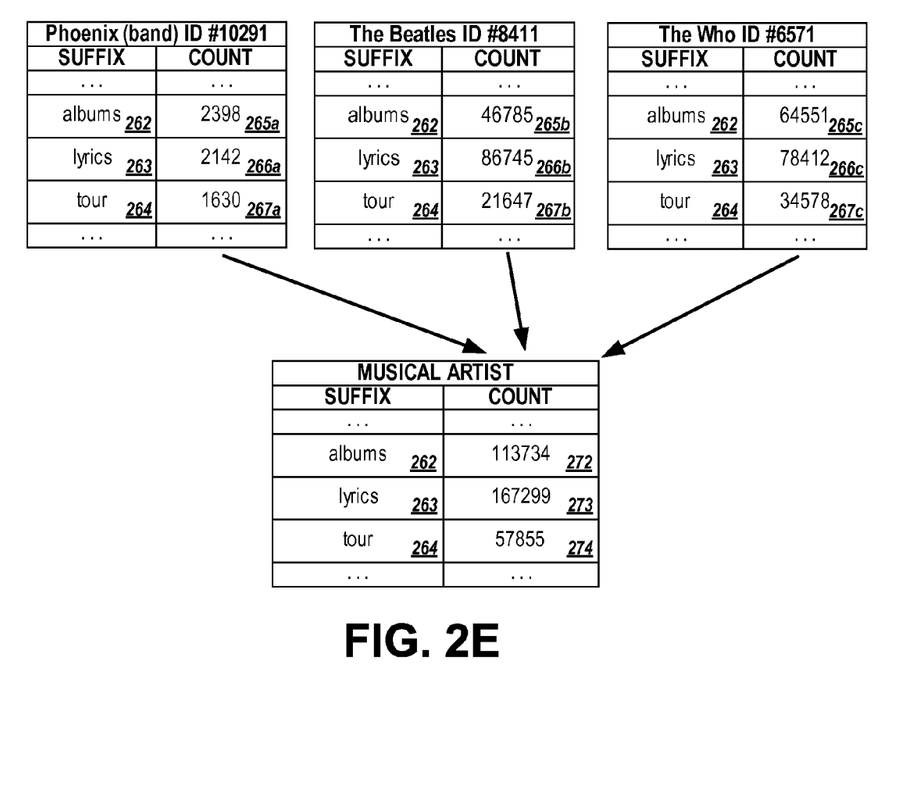

For example, as shown in FIG. 2E, suffixes 262, 263, 264 and corresponding entity-level suffix counts 265*a*-265*c*, 266*a*-265*c*, 267*a*-267*c* are illustrated for three different entities, the band Phoenix, The Beatles, and The Who. The type-level analysis module 140 determines that each of these entities is of the "musical artist" entity type. For each suffix, the type-level analysis module 140 adds the entity-level suffix counts for all entities of a particular type to determine a type-level suffix count.

In the illustrated example, the type-level suffix counts 272, 273, 274 are all determined for the "musical artist" entity type. For the suffix 262, "albums," the type-level suffix count 272 is the sum of the entity-level suffix counts 265*a*-265*c*. Similarly, the type-level suffix count 273 for the suffix 263, "lyrics," is the sum of the entity-level suffix counts 266*a*-266*c*, and the type-level suffix count 273 for the suffix 263, "lyrics," is the sum of the entity-level suffix counts 266*a*-266*c*. Adding together the entity-level suffix counts for all musical artists produce counts that reflect how frequently the users request certain types of information in searches about musical artists. The suffixes with the highest type-level suffix counts can represent information that search engine users, as a whole, have most frequently requested about musical artists. For example, the type-level suffix count 273 for the suffix 263, "lyrics," is higher than the other type-level suffix counts 272, 274, indicating that users have requested information about lyrics of musical artists more than, for example, information about albums of musical artists or tours of musical artists. As a result, when a typical search engine user enters a search about a musical artist, the typical user may be more likely to be interested in information about lyrics than in other topics.

For a given entity type, the type-level analysis module 140 can determine a type-level suffix count for each suffix occurring in a query referring to an entity of that entity type. For example, for the entity type of "musical artist," a type-level suffix count can be determined for every suffix that has been used with any musical artist. Type-level suffix counts can be determined for each entity type of each entity that the query-to-entity map 116 referred to by the queries 201 in the query data 114.

When an entity is associated with multiple entity types, the entity-level suffix counts are included in the type-level suffix counts for each of the multiple entity types. Each entity-level suffix count can be included fully for each entity type, without dividing the counts among the entity types. For example, the band Phoenix is of entity type "musical artist," entity type "record producer," and entity type "award winner." The full entity-level suffix count for the suffix 262, "albums," is included in (i) the type-level suffix count 272 for "albums" for the entity type "musical artist," (ii) the type-level suffix count for "albums" for the entity type "record producer," and (ii) the type-level suffix count for "albums" for the entity type "award winner."

Referring to FIG. 1, in stage (E), the filtering module 150 filters the set of suffixes for each entity type according to one or more criteria. For a particular entity type, the filtering module 150 begins with the set of all suffixes that occur with any entity of the particular entity type. The filtering module 150 then selects suffixes from among this set that satisfy the one or more criteria. In some implementations, the same one or more criteria are applied for each entity type.

The one or more criteria can include, for example, whether the suffix represents a request for information that is factual, objectively measurable, commonly agreed upon, and/or static or unchanging. Suffixes having one or more of, or all of, these characteristics can be selected. As described further below, the filtering module 150 may use input from human raters to determine whether a suffix represents a request for information that meets the one or more criteria with respect to a particular entity type. In some instances, the same suffix may satisfy the one or more criteria for one entity type, but not for a different entity type.

In some implementations, the filtering module 150 ranks the suffixes for an entity type according to their type-level suffix counts and selects a highest-ranking portion for further processing. For example, the filtering module 150 can select as the highest-ranking portion the set of suffixes that have the N-highest type-level suffix counts, where N is an integer, such as 50, 100, 300, or 1000. Lower-ranking suffixes may be removed from the set.

The filtering module 150 then obtains information indicating whether the highest-ranking suffixes satisfy the one or more criteria. For example, the filtering module 150 sends, to a panel 180 of human raters 182a-182c, one or more requests 151 that identify the highest-ranking suffixes for a particular entity type. For example, for the entity type "musical artist," the human raters 182a-182c may be asked whether the suffixes "albums," "lyrics," "tour" and other suffixes each represent a universally accepted fact for the entity type "musical artist."

In some implementations, the human raters 182a-182c are asked to rate the suffixes with respect to a particular example entity. Different raters may be asked to rate the suffixes with respect to different entities. For example, to obtain ratings for the entity type "musical artist," one human rater 182a (or one set of multiple raters) may be asked whether the suffix, "albums," satisfies the one or more criteria with respect to the band Phoenix, and another rater 182b (or a different set of multiple raters) may be asked whether the same suffix, "albums," satisfies the one or more criteria with respect to The Beatles. The example entities can be selected randomly from among the entities of the "musical artist" entity type. In some implementations, for each entity type, three or more different human raters are requested to provide ratings with respect to each example entity, and three or more different example entities are selected.

The human raters 182a-182c provide ratings 152 indicating the degree that the suffixes satisfy the one or more criteria. The human raters 182a may indicate their opinions as a rating on a scale (e.g., as an integer on a scale from zero to nine), as a binary value, or in another form. In some implementations, the ratings indicate whether a suffix represents a universally accepted fact, and thus represents a type of information that a typical search engine user may be interested in. For example, for a musical artist, "albums" refers to the identity of albums by the artist, which is factual. However, the temperature of a body of water may not be considered a universally accepted fact because the temperature can vary over time and at different depths. Similarly, suffixes that represent navigational queries (e.g., "torrent," "website," and "youtube," which refer to Internet locations) rather than informational queries can also be non-factual. Other one or more criteria can also be applied, such as favoring factual information that is concise or can be displayed within a particular area.

The filtering module 150 combines the ratings obtained from individual human raters 182a-182c to generate an average or overall rating for each suffix with respect to the entity type. The filtering module 150 compares the overall rating for each suffix to a threshold. Each suffix that has an overall rating that satisfies the corresponding threshold is retained in the set as a suffix for the entity type. Each suffix that has an overall rating that does not satisfy the corresponding threshold is removed from the set. When multiple criteria are used, an overall rating may be determined for each of the different criteria, and each overall rating may be compared to an appropriate threshold.

The filtering module 150 then outputs data identifying the suffixes that satisfy the one or more criteria, for example, by storing data that annotates the selected suffixes as having particular characteristics. For example, suffixes can be annotated as corresponding to factual information about entities of a particular entity type.

In some implementations, the filtering module 150 filters the set of suffixes associated with each entity according to one or more criteria, in addition to or as an alternative to filtering the suffixes for the entity types. The criteria for filtering the suffixes of individual entities may be the same criteria used for filtering suffixes corresponding to entity types. For example, the suffixes associated with individual entities may be filtered to obtain a subset that includes only suffixes that are scored as factual (e.g., indicating a request for an objective fact) based on input from human raters, as described above.

In some implementations, the filtering module 150 filters suffixes of individual entities using data about suffixes that satisfy the one or more criteria for one or more entity types of the entity. In some implementations, entities are only permitted to have suffixes that are factual for at least one of their entity types. If a suffix satisfies the one or more criteria with respect to an entity type, the suffix can be considered to satisfy the one or more criteria for all entities of that entity type.

The filtering module 150 may select a subset of suffixes for a particular entity to include only the suffixes that satisfy the one or more criteria for at least one of the entity types of the particular entity. For a given entity, the filtering module 150 may compare each suffix for the entity with the list of suffixes that are designated as satisfying the one or more conditions with respect to that entity's entity types. If the filtering module 150 determines that a suffix for the entity matches a suffix designated as satisfying the one or more criteria for the entity's entity type(s), the filtering module 150 includes the suffix in the subset. If the filtering module 150 determines that the suffix does not match any suffix designated as satisfying the one or more criteria for the entity's entity type(s), the suffix is excluded from the subset.

As an example, an entity may have three corresponding entity types, type A, type B, and type C, and the one or more criteria for filtering may require suffixes to be factual. If a given suffix, such as "height," has been designated as factual for entities of type A, the filtering module 150 designates the suffix as factual for the entity, even if the suffix "height" is not designated as factual for entities of type B or type C. However, if a suffix is not designated as factual for any of type A, type B, or type C, then it the suffix is not designated as factual for the entity.

In stage (F), the scoring and ranking module 160 produces, for each entity, a set of suffix scores using a combination of entity-level data and type-level data. For example, the scoring and ranking module 160 uses linear interpolation of entity-level suffix counts and type-level suffix counts to produce the suffix scores. The suffixes for each entity are ranked based on the suffix scores.

For entities with a high amount of fact-seeking traffic, the interpolation of entity-level and type-level counts has a small effect on the overall ranking of the suffixes. However, for entities that are rarely the subject of informational queries, the type-level counts can adjust the rankings of suffixes significantly relative to a ranking based on entity-level data alone. For example, for an obscure city, the number of informational queries may be very limited, and may not clearly indicate the information about the city that users are interested in. However, type-level data for cities in general may indicate the suffixes that are frequently used in searches about other cities, such as "zip codes" and "weather." By interpolating the type-level suffix counts with the entity-level suffix counts, the frequently occurring suffixes for cities in general can be ranked as suffixes of interest for the obscure city, even if users have not previously submitted queries for that city using those suffixes.

In some implementations, the scoring and ranking module 160 generates suffix scores for entities using the following equation:

$$S_e = C_e + \min(a \cdot C_t, b)$$

where, for a given suffix, $S_e$ is the suffix score for the suffix for a particular entity, $C_e$ is the entity-level suffix count for the suffix for the particular entity, $C_t$ is the type-level suffix count for the suffix for the entity type of the particular entity, a is a scaling factor, and b is an empirically derived constant (e.g., 1, 5, 10, 100, etc.). Because the equation selects the smaller of the term $a \cdot C_t$ and b, the constant, b, limits the maximum contribution of the type-level suffix counts, $C_t$, to the score, $S_e$, thereby limiting the potential for type-level data to have too high of influence relative to entity-level data. In some implementations, the equation provided above may not be calculated explicitly.

In some implementations, the scaling factor, a, is based on a maximum entity count. For example, the scaling factor, a, may be calculated according to the following equation:

$$a = \min(1.0, b/C_{tMAX})$$

where b is the empirically derived constant described above (which represents the maximum permitted contribution of type-level suffix counts to the score $S_e$), and $C_{tMAX}$ is the highest type-level suffix count $C_t$ from among the type-level suffix counts for the suffixes for this entity type.

Figure 2F:
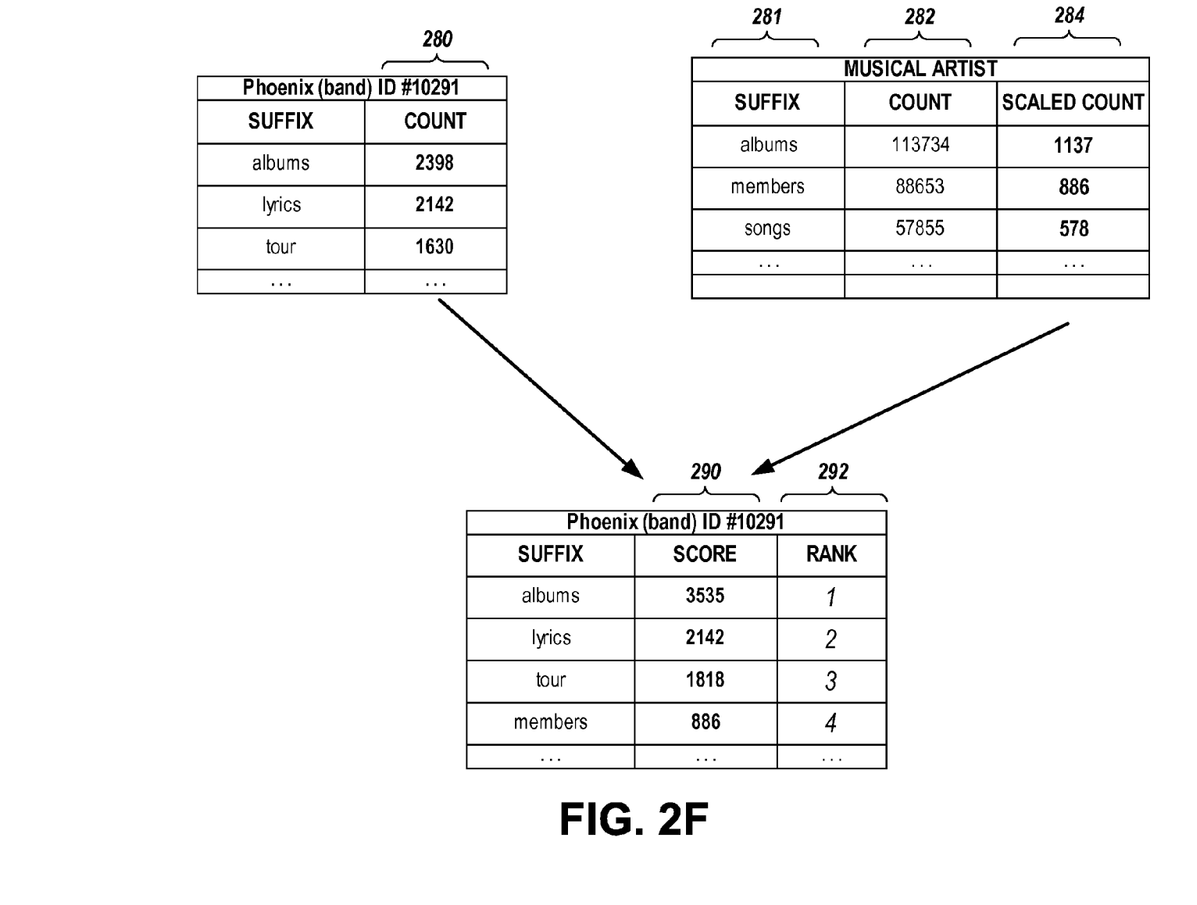

Referring to FIG. 2F, in the illustrated example, suffix scores 290 are generated based on entity-level suffix counts 280 for the band Phoenix, and type-level suffix counts 282 for the entity type "musical artist." The type-level suffix counts 282 are counts for suffixes 281 that were determined to satisfy the one or more criteria of stage (E), for example, suffixes 281 that were determined to represent objective, universally accepted facts. The type-level suffix counts 282 are multiplied by a scaling factor (in this example, a scaling factor of 0.01) to generate scaled counts 284. The scaled counts are added to entity-level suffix counts 280 to generate the suffix scores 290.

In some implementations, when an entity has multiple entity types, the type map 117 provides a ranking of, or other indication of priority among, the multiple entity types. For example, the type map 117 can indicate a highest-ranked type (e.g., a primary or dominant entity type), also referred to as a "notable type." As an example, the entity "Barack Obama" may be classified as a President of the United States, as an author, and as a person, and the notable type may be the entity type "President of the United States." As another example, the entity "Phoenix, Ariz." may be classified as both a city and a location, and the notable type may be the entity type "city." The notable type may be the most specific of an entity's types, or may be the entity type determined to be most relevant to a set of queries about the entity.

In some implementations, only type-level data for a single entity type, the notable type, is combined with entity-level data to calculate overall suffix scores (e.g., the combined suffix scores 290). For example, only suffixes for the notable type and for the entity itself may be evaluated, and suffixes for other entity types of the entity may be ignored. In some implementations, type-level data for multiple types of an entity may be combined with entity-level data. For example, type-level data for all of the entity types of an entity may be combined when generating the suffix scores 290.

The ranking and scoring module 160 generates suffix scores and a ranked list of suffixes for each entity referred to in the query data 114. The list of suffixes can identify the suffixes that have been designated as satisfying the one or more criteria by the filtering module 150. Data can be stored that identifies, for each entity, the set of suffixes and the corresponding suffix scores.

In some implementations, the ranking and scoring module 160 determines an attribute that corresponds to each suffix. The scoring and ranking module 160 can identify the attributes associated with suffixes using a suffix-to-attribute map 118 (FIG. 1). An attribute can be a standardized type of information, such as a type of requested fact corresponding to a query term such as a suffix. For example, for an entity that is a mountain, the suffixes "how tall," and "highest point" can be mapped to a "height" attribute. In some implementations, each attribute has an identifier that refers to one of a predetermined set of facts or characteristics. The identifier may identify a data structure or a portion of a database where information about the attribute can be accessed. Information identifying attributes can be stored in addition to, or instead of, information identifying the corresponding suffixes.

Using the query analysis techniques described above, the computing system 110 obtains, for each of various entities, an entity-specific ranking of suffixes. The highest-ranking suffixes correspond to attributes that can be designated as frequently requested facts about the entity. In some implementations, when a user submits a search that is determined to refer to an entity, the frequently requested facts for the entity can be provided in response to the search query. When the frequently-requested facts are displayed to users, they may be displayed in the ranked order or in a different order. In some implementations, the facts corresponding to particular attributes are consistently presented for all entities of a given entity type. For example, for the entity type "person," attributes of "date born" and "date died" may be placed at a consistent position (e.g., always at the top of a display area for the frequently-requested facts) for all entities that are classified as persons, regardless of the ranking of the attributes, and/or regardless of whether the attributes were designated as frequently-requested facts for the particular entity. Including data about one or more attributes for each entity of a particular entity type and/or displaying the data in a consistent position or format can help provide a consistent user experience across searches relating to multiple entities of the same entity type.

In some implementations, the rankings of suffixes or attributes are used to prioritize curation of factual information. The rankings of attributes or suffixes can indicate the information that is mostly likely to be useful to users of a database or other information system. For example, efforts to update or complete a database that describes entities can be focused on the highest-ranked attributes of the entities, which can improve the likelihood that information of interest will be available to users.

Curation of factual information can be performed with human input and/or automatic (e.g., programmatic or algorithmic) extraction of data. Information can be obtained through a combination of human input and automated extraction. For example, automatic pre-processing and filtering can be performed to obtain data, followed by human evaluation of the data. In some implementations, the computing system 110 determines whether information about the attributes for various entities is available in an information source. When the computing system 110 determines that information about individual entities (or about entities of one or more entity types) is not available, the computing system issues, to human curators or extraction systems, requests to obtain the information. The computing system 110 can prioritize the requests according to the ranking of the attributes (e.g., the ranking of or suffix counts for the suffixes corresponding to the attributes). As a result, information for the highest-ranked attributes can be requested and added to the knowledge source before information for lower-ranked attributes.

As an example, a system may have a limited capacity to obtain information about the attributes of entities. For example, in a curation cycle, a system may have a capacity to obtain information about an attribute of approximately 10,000 different entities. Based on analysis of queries and the contents of an information source, the computing system 110 may determine that, for various entities referred to in a set of search queries, information about one or more attributes is unavailable in the information source. For example, the computing system 110 may determine that, for various musical artists, album information is unavailable.

In some implementations, the computing system 110 assigns a traffic-weighted coverage score to attributes. The coverage score for an attribute can indicate, for example, a frequency with which queries in a set of queries refer to an entity that: (i) is of a particular type (e.g., is a musical artist); and (ii) does not have information for the attribute (e.g., album information) available in the information source. Coverage scores can be computed for multiple attributes of entities of a given entity type, and for attributes of entities of many different entity types.

The computing system 110 issues curation requests based on the coverage scores for the attributes and the type-level rankings of the attributes. For example, the computing system 110 selects attributes for which a coverage score does not satisfy a threshold, indicating that the information source provides an unacceptable level of coverage for the attribute. From the set of selected attributes for which additional information is needed, the computing system 110 requests information in order according to the type-level ranking of the attributes. For example, when curating information about musical artists, the computing system 110 may identify multiple attributes about musical artists for which additional information is needed. The computing system 110 may determine that the type-level suffix count for the suffix "albums" (which is mapped to the attribute for album information), is higher than for the type-level suffix count for the suffixes mapped to the other attributes. In response, the computing system 110 prioritizes collecting album information ahead of collecting other information about the musical artists (e.g., by allocating the limited capacity of the system to request or obtain the album information before the other information.)

For a given entity type, the computing system 110 selects, from a set of entities of the given entity type for which the attribute data is unavailable, the entities that are most frequently referred to in search queries. The computing system 110 then sends requests to obtain the information about the attribute for the selected set of entities. For example, the computing system selects, from the set of musical artists for which album information is not available, the 10,000 musical artists that are most frequently referred to in a set of search queries. The computing system 110 requests that an automated computing system extract information about the attribute (e.g., album titles) for each of the 10,000 selected entities. In addition, or as an alternative, the computing system 110 sends requests to human curators to find album information for the 10,000 musical artists and add it to the information source. As the human curators fill in this information (e.g., by corroborating evidence from multiple websites or other offline data sources), the human curators may also fill in other information missing for those musical artists, such as awards that a musical artist has won, because other information about an entity tends to be provided in similar places. In subsequent curation cycles, the computing system 110 may obtain information for other attributes of musical artists, and/or information for attributes of entities of other entity types.

Figure 3:
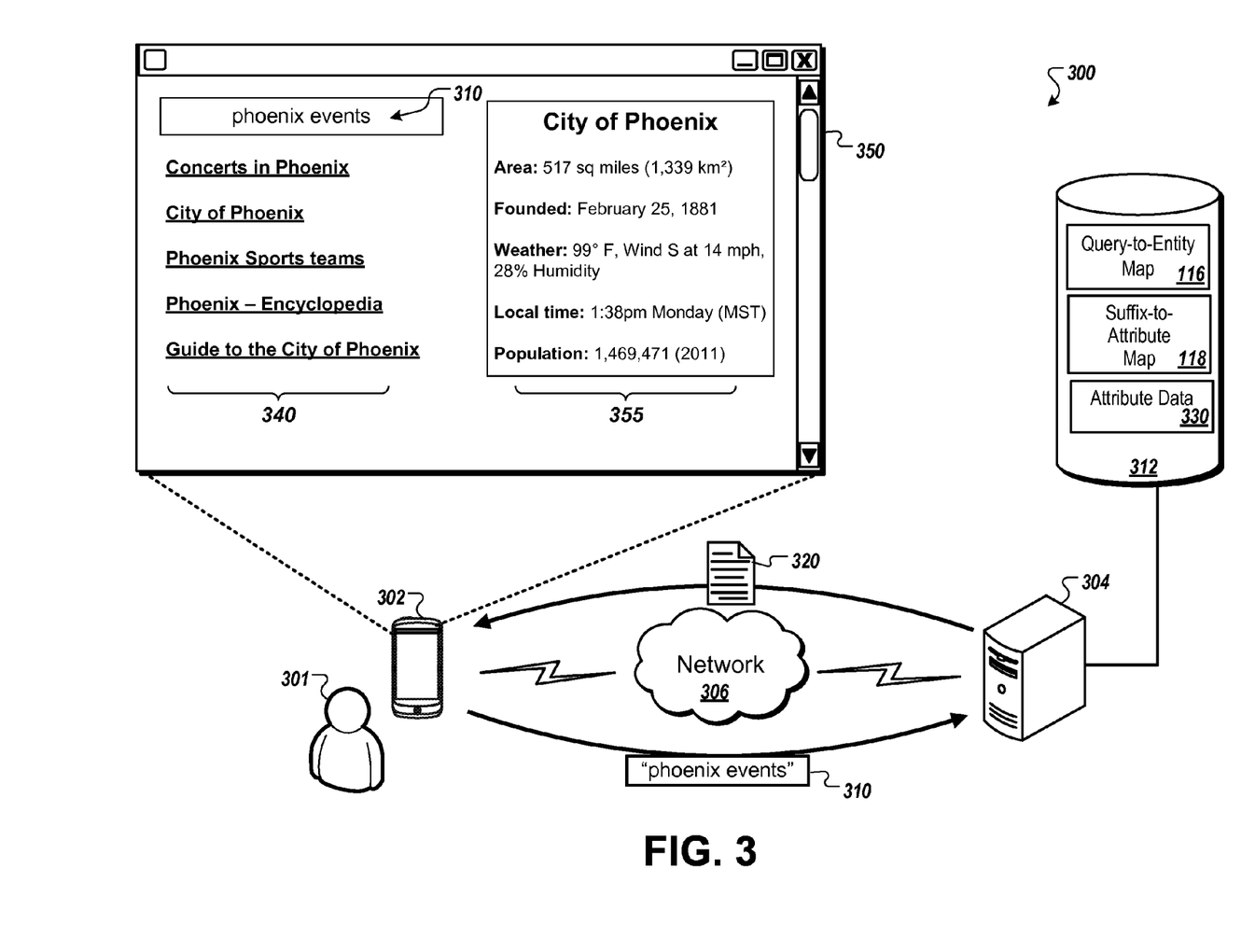
FIG. 3 is a diagram illustrating an example of a system for responding to a query.

FIG. 3 is a diagram illustrating an example of a system 300 for responding to a query. The system 300 includes a computing device 302 that communicates with a search engine system 304 over a network 306. The computing device 302 can be, for example, a desktop computer, a laptop computer, a cellular phone, a smartphone, a personal digital assistant (PDA), a tablet computer, a wearable computer, a navigation system, or another computing device. The operations performed by the search engine system 304 can be performed by individual computer systems or can be distributed across multiple computer systems. The network 306 can be wired or wireless or a combination of both. The network 306 can include one or more public or private networks, and can include the Internet.

The system 300 uses the suffix scores and query analysis described above to provide information in response to search queries. A user 301 submits a query 310 to the search engine system 304. In the illustrated example, the query 310 is "phoenix events."

The search engine system 304 generates a web page 320 as a response to the query 310. The search engine system 304 identifies one or more resources that are relevant to the query 310, and provides search results 340 in the web page 320 that identify the one or more resources.

The search engine system 304 also looks up the query in the query-to-entity map 116. Based on output from the query-to-entity map 116, such as one or more probability scores for different entities, the search engine system 304 determines that the query 310 likely refers to a particular entity. For example, the search engine system 304 determines that the probability that the query refers to a particular entity satisfies a threshold. For example, the probability can be determined to exceed 60%, 70%, 80%, or another value. In the illustrated example, the search engine system 304 determines that the query 310 most likely refers to the city of Phoenix.

The search engine system 304 also accesses attribute data 330 that identifies the suffixes or attributes for the entity referred to by the query. For example, the search engine system 304 can access the suffix counts for the city of Phoenix, and use the suffix counts to determine a highest-ranking set of suffixes. The attributes for the highest-ranking suffixes are selected for display in response to the query 310. For example, the search engine system 304 determines that the attributes corresponding to the 5 highest-ranked suffixes for the city of Phoenix are size, founding date, weather, local time, and population. The search engine system 304 includes information about each of these attributes in the web page 320.

In some implementations, after the top 5 attributes are selected to be transmitted to the user, the attributes may be reordered for the purposes of scannability by the user. In many instances, users quickly scan web pages rather than carefully reading web pages word by word. To improve scannability, content can be presented in short, discrete segments that are accessible at a glance. For example, the search engine system 304 generates the web page 320 to show attributes with number values first (e.g., at the top of a display area of the rendered web page 320), followed by attributes with a single text value, then attributes with multiple text values, etc. Attributes may also be ordered in an ordering or format that is consistent for all entities of the same entity type, as described above.

The search engine system 304 transmits the web page 320 to the computing device 302. The computing device 302 displays the web page 320 on a user interface 350, which shows the search results 340 and a display area 355 that presents information about attributes of the city of Phoenix. Although the query 310 did not specifically request data for the attributes shown, analysis of the query data 114 previously indicated that these attributes are likely to be of interest to typical search engine users. In general, as users submit searches about different entities, information about the attributes most pertinent to each entity can be provided to the user.

Figure 4:
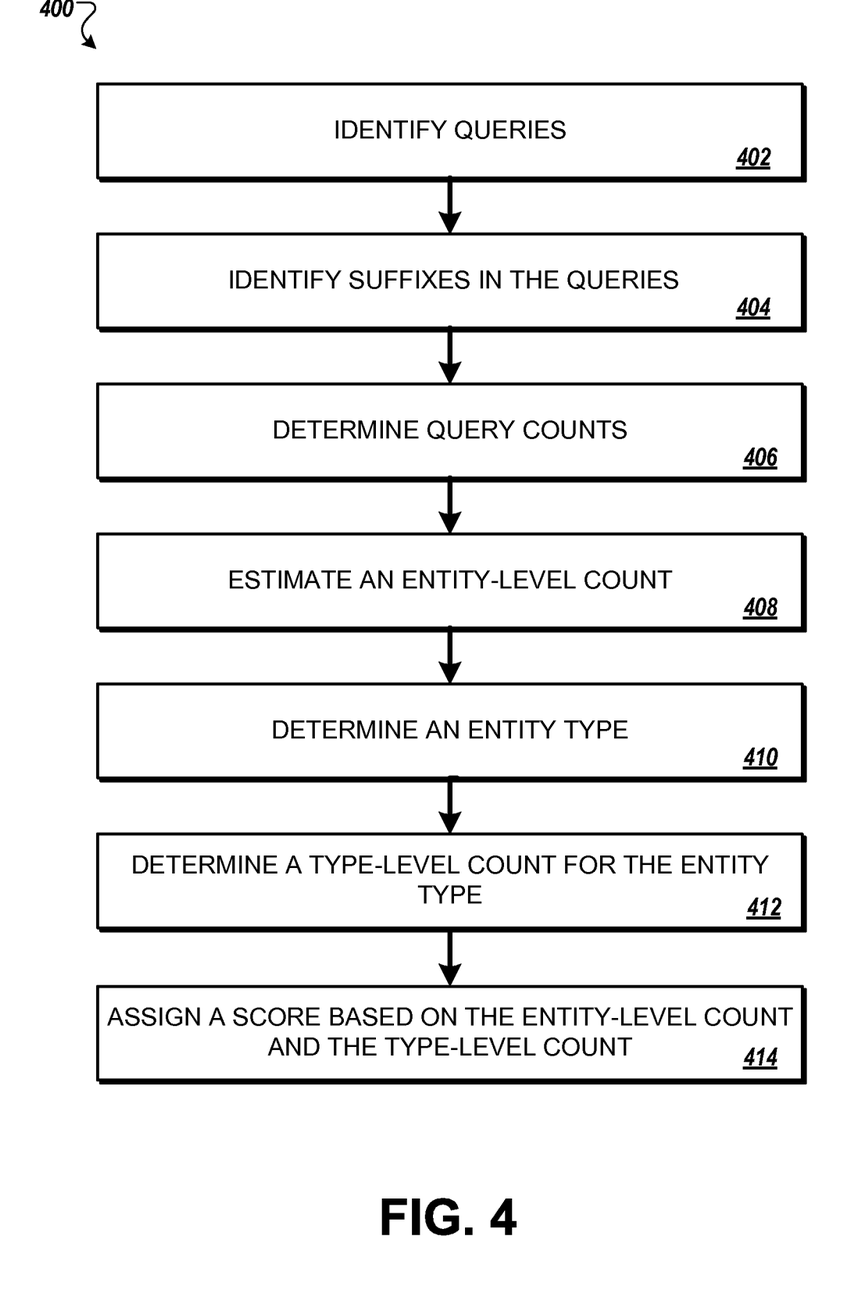
FIG. 4 is a flow diagram that illustrates an example of a process for query analysis.

FIG. 4 is a flow diagram that illustrates an example of a process 400 for query analysis. The process 400 may be performed by one or more computing devices, such as the computing system 110 of FIG. 1.

Queries are identified in query data (402). In each of the queries, a suffix is identified (404). The suffix can be a portion of a query that identifies a type of information requested about an entity. An entity-descriptive portion that refers to an entity can also be identified in each of the queries.

Query counts, indicating a number of times that the respective queries were submitted, are determined (406). For example, for each unique query string, the number of occurrences of the query string in the query data can be counted.

Based on the query counts, an entity-level count is estimated (408). The entity-level count can be an estimate of a number of query submissions that include a particular suffix and are considered to refer to a first entity. For example, the entity-level count can be a partial query count in proportion to the likelihood that the query refers to the first entity.

In some implementations, to estimate the entity-level count, a probability score is obtained that indicates a probability that a query refers to the first entity. The query count is adjusted based on the probability score, and the adjusted query count is selected as the entity-level count. For example, the query count can be multiplied by a scaling factor based on the probability that the query refers to the first entity.

In some instances, multiple queries with different query terms include the same suffix and each have a likelihood of referring to the same first entity. To determine the entity-level count, portions of query counts of the multiple queries can be added together.

In some implementations, to estimate the entity-level count, distributing the query count for a query is distributed among multiple different entities based on probability scores. A partial query count is assigned to each of the multiple different entities, and each partial query count represents an estimate of a number of occurrences of the query in the query data that refer to the entity.

The first entity is determined to be a particular type of entity (410). The entity type for an entity can be determined by looking up an identifier for the entity in a data structure that associates entities with entity types.

A type-level count of query submissions is determined (412). The type-level count can indicate a number of query submissions in the query data that include the particular suffix and are estimated to refer to an entity of the particular type of entity.

A score is assigned to the particular suffix based on the entity-level count and the type-level count (414). The score can be an entity-specific score. For example, the score can be a measure that indicates a level of interest that search engine users are likely to have, with respect to the first entity, for a particular type of information.

In some implementations, assigning the score comprises determining a linear interpolation of the entity-level count and the type-level count. For example, the score can be determined by multiplying the type-level count by a scaling factor to generate a scaled count, and adding the scaled count to the entity-level count.

For a given entity, a score can be determined for each of multiple suffixes that occur in queries estimated to refer to the first entity or to other entities of the particular type of entity. The multiple suffixes can be ranked based on the scores. Data identifying the scores and/or the rankings can be stored.

In some implementations, scores are obtained for one or more other suffixes that occur in query submissions that are estimated to refer to an entity of the particular entity type. The particular suffix and the other suffixes are ranked based on their respective scores. The one or more other suffixes may occur in queries that are estimated to refer to the first entity. The one or more suffixes may occur in queries that that are not determined to refer to the first entity, but are determined to refer to an entity of the particular type (e.g., an entity of the same type as the first entity).

In some implementations, multiple suffixes are assigned scores with respect to the first entity and are ranked. The suffixes in a highest-ranking portion of the ranked suffixes are selected. For example, the ranked suffixes with the N-highest scores can be selected, where N is an integer. Each of the selected suffixes can be mapped to a factual attribute of the first entity. The factual attributes can be designated as frequently requested facts about the first entity.

In some implementations, a query submission is received from a user. A likelihood that the query submission refers to the first entity is determined. For example, a probability score can be obtained, where the probability score indicates a probability that query terms of the query submission refer to the first entity. A determination is made that the likelihood that the query submission refers to the first entity satisfies a threshold. In response to the determination, data is accessed that identifies the factual attributes designated as frequently requested facts about the first entity. Information about the first entity for each of the factual attributes is provided in response to receiving the query submission. The information may be provided in a search results page that presents the information about the first entity for each of the factual attributes with search results responsive to the query submission. As an example, when the search results page is displayed, the information about the factual attributes can be displayed next to (e.g., adjacent to, or in a display area located to the side of) search results that reference resources such as web pages.

In some implementations, an attribute corresponding to the particular suffix is selected as an attribute for the first entity, based on the score assigned to the particular suffix. A query submission that refers to the first entity can be received. Data that identifies the attribute and a value of the attribute for the first entity are provided in response to the query. As an example, where the first entity is the Empire State Building, the attribute could be indicated to be "height" and the corresponding value of the attribute for the first entity could be indicated to be "1,454 feet." The value of an attribute can include numbers, text, images, and/or other content.

In some implementations, multiple suffixes are assigned scores with respect to the first entity and are ranked. A highest-ranking portion of the ranked suffixes is selected. A determination is made that one or more of the suffixes in the highest-ranking portion are associated with an objective fact. In response to the determination, the one or more selected suffixes are mapped to a factual attribute, and the factual attributes are designated as frequently requested attributes for the first entity. The factual attributes may be designated as frequently requested attributes for one or more other entities of the particular type.

In some implementations, to determine that suffixes are associated with an objective fact, input is obtained from one or more human raters indicating whether the one or more human raters consider the selected suffixes to be associated with objective facts. A list of suffixes can be sent to each of multiple human raters, where the suffixes occur in query submissions that reference a particular entity of the first type. Input is received from each of the multiple human raters. The input indicates whether the human raters consider each of the suffixes to be associated with an objective fact for the particular entity. The particular entity may be selected randomly from a set of multiple entities of the particular type of entity, and thus may be different from the first entity.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method performed by data processing apparatus, the method comprising:
   identifying queries in query data;
   determining, in each of the queries, (i) an entity-descriptive portion that refers to an entity and (ii) a suffix;
   determining query counts of a number of times that the respective queries were submitted;
   for at least a particular query of the identified queries, distributing the query count for the particular query among multiple different entities by assigning, to each of the multiple different entities, a partial query count that is an estimate of a number of submissions of the particular query that refer to the entity;
   estimating, based at least in part on one or more of the partial query counts, an entity-level count of query submissions that include a particular suffix and are considered to refer to a first entity of the multiple different entities;
   determining that the first entity is a particular type of entity;
   determining a type-level count of the query submissions that include the particular suffix and are estimated to refer to entities of the particular type of entity; and
   assigning, based on the entity-level count and the type-level count, a score for the particular suffix with respect to the first entity.

2. The method of claim 1, further comprising:
   obtaining scores for one or more other suffixes that occur in query submissions estimated to refer to an entity of the particular entity type; and
   ranking the particular suffix and the other suffixes based on their respective scores.

3. The method of claim 2, further comprising:
   selecting suffixes in a highest-ranking portion of the ranked suffixes;
   mapping each of the selected suffixes to a factual attribute of the first entity; and
   designating the factual attributes as frequently requested facts about the first entity.

4. The method of claim 3, further comprising:
   receiving a user query submission that does not include the particular suffix;
   determining that a likelihood that the user query submission refers to the first entity satisfies a threshold;
   in response to determining that the likelihood that the user query submission refers to the first entity satisfies a threshold:
     accessing data identifying the factual attributes designated as frequently requested facts about the first entity, the factual attributes comprising a factual attribute corresponding to the particular suffix; and
     providing, in response to the user query submission, information about the first entity for each of the factual attributes including information for the factual attribute corresponding to the particular suffix that is not included in the query submission.

5. The method of claim 4, wherein providing information about the first entity for each of the factual attributes comprises providing a search results page that presents the information about the first entity for each of the factual attributes with search results responsive to the user query submission.

6. The method of claim 2, further comprising:
   selecting a highest-ranking portion of the ranked suffixes;
   determining that one or more of the highest-ranking suffixes are each associated with an objective fact; and in response to determining that one or more of the selected suffixes are each associated with an objective fact:
mapping each of the one or more of the selected suffixes to a factual attribute; and
designating the factual attributes as frequently requested attributes for the first entity.

7. The method of claim 1, further comprising:
based on the score assigned to the particular suffix, selecting an attribute corresponding to the particular suffix as an attribute for the first entity;
receiving a query submission that refers to the first entity; and
in response to receiving the query submission that refers to the first entity, providing data that identifies the attribute and a value of the attribute for the first entity.

8. The method of claim 1, wherein distributing the query count for the particular query among the multiple different entities comprises:
obtaining a probability score for each of the multiple different entities, wherein each of the probability scores indicates a probability that the particular query refers to the entity associated with the probability score; and
assigning the partial query counts to the multiple different entities based on the probability scores.

9. The method of claim 8, wherein obtaining a probability score for each of the multiple different entities comprises obtaining the probability scores for the multiple different entities based on the entity-descriptive portion of the particular query and the suffix of the particular query.

10. The method of claim 1, wherein assigning the score for the particular suffix with respect to the first entity comprises determining the score for the particular suffix as a combination of (i) a first value based on the entity-level count and (ii) a second value that is based on the type-level count and is limited to a maximum value.

11. The method of claim 10, wherein determining the score for the particular suffix with respect to the first entity comprises:
determining a scaled score by applying a scaling factor to the type-level count;
determining that the scaled score is greater than a predetermined maximum value; and
in response to determining that the scaled score is greater than the predetermined maximum value, determining the score for the particular suffix as a combination of the first value and the predetermined maximum value.

12. The method of claim 1, wherein multiple different suffixes are associated with the particular type of entity, each of the multiple different suffixes having a corresponding type-level count;
wherein assigning the score for the particular suffix with respect to the first entity comprises:
determining a scaling factor for the type-level count for the particular suffix based on a highest type-level count from the different type-level counts of the multiple different suffixes, the highest type-level count being different from the type-level count for the particular suffix;
determining a scaled score by applying a scaling factor to the type-level count; and
assigning the score for the particular suffix based on the entity-level count and the scaled score.

13. The method of claim 1, further comprising:
determining that, in addition to being the particular type of entity, the first entity is also a second type of entity; and
determining a second type-level count of the query submissions that include the particular suffix and are estimated to refer to entities of the second type of entity; and
wherein assigning the score for the particular suffix with respect to the first entity comprises assigning the score for the particular suffix with respect to the first entity based on the entity-level count, the type-level count for the particular type, and the second type-level count.

14. The method of claim 1, further comprising:
determining that the first entity is assigned to each of multiple different entity types; and
determining a ranking of the multiple different entity types with respect to the first entity.

15. The method of claim 14, further comprising determining, based on the ranking of the multiple different entity types, a dominant entity type for the first entity;
wherein determining the type-level count of the query submissions that include the particular suffix and are estimated to refer to entities of the particular type of entity comprises determining a dominant type-level count of the query submissions that include the particular suffix and are estimated to refer to entities of the dominant entity type; and
wherein assigning the score to the particular suffix based on the entity-level count and the type-level count comprises assigning the score to the particular suffix based on the entity-level count and the dominant type-level count.

16. A system comprising:
one or more computers and one or more storage devices storing instructions that are operable, when executed by the one or more computers, to cause the one or more computers to perform operations comprising:
identifying queries in query data;
determining, in each of the queries, (i) an entity-descriptive portion that refers to an entity and (ii) a suffix;
determining query counts of a number of times that the respective queries were submitted;
for at least a particular query of the identified queries, distributing the query count for the particular query among multiple different entities by assigning, to each of the multiple different entities, a partial query count that is an estimate of a number of submissions of the particular query that refer to the entity;
estimating, based at least in part on one or more of the partial query counts, an entity-level count of query submissions that include a particular suffix and are considered to refer to a first entity of the multiple different entities;
determining that the first entity is a particular type of entity;
determining a type-level count of the query submissions that include the particular suffix and are estimated to refer to entities of the particular type of entity; and
assigning, based on the entity-level count and the type-level count, a score for the particular suffix with respect to the first entity.

17. The system of claim 16, wherein the operations further comprise:
obtaining scores for one or more other suffixes that occur in query submissions estimated to refer to an entity of the particular entity type; and
ranking the particular suffix and the other suffixes based on their respective scores.

18. The system of claim 17, wherein the operations further comprise:
selecting suffixes in a highest-ranking portion of the ranked suffixes;
mapping each of the selected suffixes to a factual attribute of the first entity; and
designating the factual attributes as frequently requested facts about the first entity.

19. The system of claim 18, wherein the operations further comprise:
receiving a user query submission that does not include the particular suffix;
determining that a likelihood that the user query submission refers to the first entity satisfies a threshold;
in response to determining that the likelihood that the user query submission refers to the first entity satisfies a threshold:
accessing data identifying the factual attributes designated as frequently requested facts about the first entity, the factual attributes comprising a factual attribute corresponding to the particular suffix; and
providing, in response to the user query submission, information about the first entity for each of the factual attributes including information for the factual attribute corresponding to the particular suffix that is not included in the query submission.

20. The system of claim 16, wherein the operations further comprise:
based on the score assigned to the particular suffix, selecting an attribute corresponding to the particular suffix as an attribute for the first entity;
receiving a query submission that refers to the first entity; and
in response to receiving the query submission that refers to the first entity, providing data that identifies the attribute and a value of the attribute for the first entity.

21. The system of claim 16, wherein distributing the query count for the particular query among the multiple different entities comprises:
obtaining a probability score for each of the multiple different entities, wherein each of the probability scores indicates a probability that the particular query refers to the entity associated with the probability score; and
assigning the partial query counts to the multiple different entities based on the probability scores.

22. A non-transitory computer storage medium storing a computer program, the program comprising instructions that when executed by one or more computers cause the one or more computers to perform operations comprising:
identifying queries in query data;
determining, in each of the queries, (i) an entity-descriptive portion that refers to an entity and (ii) a suffix;
determining query counts of a number of times that the respective queries were submitted;
for at least a particular query of the identified queries, distributing the query count for the particular query among multiple different entities by assigning, to each of the multiple different entities, a partial query count that is an estimate of a number of submissions of the particular query that refer to the entity;
estimating, based at least in part on one or more of the partial query counts, an entity-level count of query submissions that include a particular suffix and are considered to refer to a first entity of the multiple different entities; determining that the first entity is a particular type of entity;
determining a type-level count of the query submissions that include the particular suffix and are estimated to refer to entities of the particular type of entity; and
assigning, based on the entity-level count and the type-level count, a score for the particular suffix with respect to the first entity.

23. The computer storage medium of claim 22, wherein the operations further comprise:
obtaining scores for one or more other suffixes that occur in query submissions estimated to refer to an entity of the particular entity type; and
ranking the particular suffix and the other suffixes based on their respective scores.

24. The computer storage medium of claim 23, wherein the operations further comprise:
selecting suffixes in a highest-ranking portion of the ranked suffixes;
mapping each of the selected suffixes to a factual attribute of the first entity; and
designating the factual attributes as frequently requested facts about the first entity.

25. The computer storage medium of claim 24, wherein the operations further comprise:
receiving a user query submission that does not include the particular suffix;
determining that a likelihood that the user query submission refers to the first entity satisfies a threshold;
in response to determining that the likelihood that the user query submission refers to the first entity satisfies a threshold:
accessing data identifying the factual attributes designated as frequently requested facts about the first entity, the factual attributes comprising a factual attribute corresponding to the particular suffix; and
providing, in response to the user query submission, information about the first entity for each of the factual attributes including information for the factual attribute corresponding to the particular suffix that is not included in the query submission.

26. The computer storage medium of claim 22, wherein the operations further comprise:
based on the score assigned to the particular suffix, selecting an attribute corresponding to the particular suffix as an attribute for the first entity;
receiving a query submission that refers to the first entity; and
in response to receiving the query submission that refers to the first entity, providing data that identifies the attribute and a value of the attribute for the first entity.

27. The computer storage medium of claim 22, wherein distributing the query count for the particular query among the multiple different entities comprises:
obtaining a probability score for each of the multiple different entities, wherein each of the probability scores indicates a probability that the particular query refers to the entity associated with the probability score; and
assigning the partial query counts to the multiple different entities based on the probability scores.

* * * * *